2,751,284

GELLING HYDROCARBON LIQUIDS WITH LIQUID GELLING AGENTS

Philip Hill, Lansing, Ill., and Richard E. Van Strien, Griffith, Ind., assignors to Standard Oil Company, Chicago, Ill., a corporation of Indiana No Drawing. Application November 26, 1952, Serial No. 322,816

7 Claims. (Cl. 44—7)

This invention relates to improvements in the preparation and use of bodying agents for gelling normally liquid hydrocarbons and other organic liquids. More particularly, the invention pertains to improved hydrocarbon gel compositions and to gelling agents useful in forming liquid hydrocarbons into gels.

Gelled hydrocarbon liquids are, of course, known in the prior art, but gelling agents of uniform and good quality have not been generally available so that such gels have often required difficult compounding conditions or could not be formed from liquid hydrocarbons by simple stirring or mixing of the gelling agent in the field. Accordingly, it is a primary object of our invention to provide a gelling agent which is effective at ambient or ordinary temperatures and which can be incorporated into normally liquid hydrocarbons by simple mixing or stirring to produce a stable gel or solid fuel.

More specifically, the invention is directed to the preparation and use of a bodying agent in preparing solidified or gelled hydrocarbon liquids useful as charges for incendiary bombs, grenades, flame throwers, land mines, and the like. The improved hydrocarbon gel composition may also be used as hydraulic fracturing media for producing channels in earth formations to increase the productivity of fluids from strata traversed by an oil or gas well as described, for example, in the Oil and Gas Journal, vol 47, No. 24 (October 14, 1948), pages 76 et seq., and in U. S. Patents 2,596,843–4.

Extensive research and field tests have established a number of exacting requirements for military incendiary gels. They must be stable at temperatures over the range of from about —40° to +65° C. so that they may be used in any climate. Under storage conditions they must not break down with loss of viscosity. They must have sufficient cohesion to prevent premature dispersion. They must adhere to a target sufficiently long to set it on fire. They must be capable of easy ignition even at subzero temperatures. In addition, it is highly desirable that the gelling agent be capable of forming gels which meet these requirements with a wide variety of hydrocarbon fuels. Such gels should be formed rapidly when relatively small amounts of gelling agent are employed.

When a gelling agent or liquid fuel thickener is employed by the military, it is greatly desired that such thickener be in liquid form so that it can be readily compounded with the liquid hydrocarbon. Particular conditions require that the liquid gelling agent be stable for long periods of time over the temperature range of from —65° F. to +165° F. Heretofore, attempts have been made to provide stable liquid gelling compositions, but they have deteriorated upon storage. For example, one such gelling agent comprises two liquids, one a solution of aluminum di-isopropoxide mono-secondary butoxide in toluene and a second liquid component comprising a mixture of isopropanol, water and fatty acid. The second liquid composition is not stable since esterification may occur to the extent of about 30% upon storage. Furthermore, at low temperatures that composition including the isopropanol becomes turbid indicating separation and a non-homogeneous mixture.

When the gelling agents of this type are used for military purposes, they are stored for long periods of time and for strategic reasons may be used under widely varying temperature conditions. The multi-liquid gelling agents used heretofore have not been entirely satisfactory under these gelling conditions and long storage periods. For example, in the arctic and subartic, temperatures are encountered which result in phase separation thereby reducing the utility of the gelling material. Likewise, under long terms of storage the isopropanol and fatty acids used in the earlier systems would esterify and greatly diminish the effectiveness of the material as a gelling component. It is, therefore, a primary object of this invention to provide a novel and useful hydrocarbon gelling component which is both stable chemically at elevated temperatures over long periods of time and physically stable at low temperatures so as to avoid phase separation.

It is, therefore, a further object of our invention to provide a liquid gelling agent for liquid hydrocarbons, which agent is not subject to deterioration on storage and which will remain a homogeneous solution at low temperatures. These and other objects will become apparent as the description of our invention proceeds.

We have found that a suitable liquid gelling agent can be produced by the use of two liquid compositions, the first comprising aluminum alkoxide and the second comprising fatty acid and water.

We have found that a compatable liquid gelling agent can be produced by the use of a first liquid composition comprising an aluminum alkoxide, such aluminum isopropoxide, aluminum di-isopropoxide mono-secondary butoxide or aluminum tertiary butoxide, in toluene or other aromatic hydrocarbon of high solvency power, and a second liquid composition comprising a mixture of a low molecular weight ketone, water and fatty acids in the range of $C_6$ and $C_{13}$, preferably isooctanoic acids.

In previous attempts to produce liquid gelling components, isopropanol has been used in an acid-water solution. However, upon storage such a solution deteriorates due to the esterification of the acid by the isopropanol. By our invention this deterioration is avoided by applying low molecular weight ketones, including cyclic ketones, in the range of $C_3$ and $C_8$ as the solutizer. Such ketones do not suffer from the esterification disability and yet have high solvent powers so as to solutize the acids.

We have found that by using low molecular weight ketones in the second liquid composition, the resulting liquid composition is a homogeneous liquid at room temperature. At —65° F. the ketone-acid-water mixture is still a homogeneous liquid, and although viscous, is still pourable. On the other hand, isopropanol-acid-water mixture of corresponding proportions on a weight basis at —65° F. is a viscous, cloudy, non-homogeneous mixture indicating that there is considerable separation of one of the components.

In the case of methyl ethyl ketone the proportion may be as much as 39.2 wt. percent (57.7% acids and 3.1% water) to produce a homogeneous liquid at room temperature. This mixture at —65° F. is also a viscous, pourable, homogeneous liquid. When employing acetone the proportion is about 32.0 wt. percent acetone (64.5 wt. percent acid and 3.5 wt. percent water).

Both the acetone mixture and the methyl ethyl ketone mixture behave like the isopropanol mixture when mixed into gasoline; i. e. the bulk of the mixture dissolves in the gasoline, but some cloudiness remains on account of water separation.

Methyl ethyl ketone is preferred in the composition since it has about the same boiling point as isopropanol and, therefore, can withstand storage at such high temperatures as 165° F.

The isooctanoic acids may be prepared by a series of reactions which include producing branched heptenes by reacting a hydrocarbon stream containing a mixture of propylene and butylenes over an acid-type catalyst; fractionating the reaction product to produce essentially pure branched heptenes; reacting the branched heptenes with CO and $H_2$ in the presence of cobalt-containing catalyst; i. e., by the well known oxo process, to produce a mixture of isooctyl aldehydes; hydrogenating the isooctyl aldehyde mixture to convert the isooctyl aldehydes to isooctyl alcohols; fractionating the isooctyl alcohols to remove therefrom substantially all components higher and lower boiling than isooctyl alcohols; converting the recovered isooctyl alcohols to alkali metal salts of the corresponding acids by fusion with an alkali metal hydroxide; and springing a mixture of the corresponding isooctanoic acids from the solution by the addition of a mineral acid.

In the utilization of our liquid type thickener for the purpose of gelling hydrocarbon materials, e. g., gasoline, two liquid components are employed. The first consists of at least 30% aluminum alkoxide, a preferred composition containing about 75 wt. percent of a mixed aluminum diisopropoxide-mono-secondary-butoxide in anhydrous toluene. The second is composed of about 55 to 65 wt. percent of fatty acids, preferably in the $C_7$ to $C_{13}$ range and more specifically isooctanoic acids, about 2 to 4 wt. percent of water and about 30 to 40 wt. percent of low molecular ketone such as acetone and/or methyl ethyl ketone.

We have provided a system and composition for use in two-liquid agents for gelling gasoline and other fuels. The active ingredient of the first composition is a solution of aluminum alkoxide, and in the second it is a fatty acid component with water. When these two liquid components are poured into gasoline, thickening occurs rapidly and resembles that obtained by the addition of solid di-acid aluminum soaps. The gelling occurs by reason of the reaction of aluminum alkoxide and the fatty acids in the presence of water to produce an aluminum di-acyl hydroxide.

We have found that an approximately equivalent weight of acetone and methyl ethyl ketone when substituted for the isopropanol of the prior art will readily solutize water in the acid. Further, the ketones have the unexpected advantage of increasing the low-temperature stability of the liquid acid gelling component. With the acid-water-ketone system clear solutions are maintained at temperatures as low as —100° F. However, in the case of the acid-water-isopropanol system cloudiness, indicating a phase separation, is observed at higher temperatures of about —65° F. to —70° F. The data set out in the following table illustrate the advantages of the acetone and methyl ethyl ketone as compared to isopropanol.

TABLE

*Relative performance of isopropanol, acetone and methyl ethyl ketone as water solutizers for isooctanoic acids*

|  | Isopropanol | Acetone | Methyl Ethyl Ketone |
|---|---|---|---|
| Parts by weight: |  |  |  |
| Alcohol or ketone | 14 | 14 | 19 |
| Water | 1.5 | 1.5 | 1.5 |
| Isooctanoic acid | 28 | 28 | 28 |
| Appearance at —80° F | Turbid | Clear | Clear |

These data indicate that a low molecular weight ketone such as methyl ethyl ketone is a substantial improvement over isopropanol since it avoids any esterification difficulties and produces a material that is stable over a wide range of temperatures and is, therefore, applicable to a greater range of gelled preparation conditions.

To produce the gel, the two liquid solution components are blended into gasoline, kerosene, diesel or jet fuel, the hydrocarbon thickening rapidly and resembling the gels obtained by the addition of solid di-acid aluminum soaps of the "Napalm" type. The aluminum alkoxide of the first liquid component and the fatty acid of the second liquid component react in the presence of water to produce an aluminum di-acyl hydroxide which concurrently with its production gels the hydrocarbon.

The resulting gels are products which are stable at temperatures over a wide range so that they may be used in any climate. They are stable under storage conditions and do not break down readily with loss of viscosity. They have sufficient cohesion to prevent premature dispersion. They are capable of adhering to a target sufficiently long to ignite it and they are capable of easy ignition even at sub-zero temperatures. Likewise, the gels form rapidly even when relatively small amounts of the gelling agent are employed. In general, we may employ between about 0.5 and 4 gallons of the aluminum alkoxide solution and between about 1 and 8 gallons of the fatty acid solution in each barrel (42 gallons) of gasoline, kerosene, diesel fuel or jet fuel to produce a gel at a desired gelling rate having a final viscosity and stable consistency necessary for military use.

The relative proportions of the two solutions will depend upon the amount of solvent in the aluminum alkoxide solution. Generally the two solutions should be in such proportions as to give approximately the stoichiometric amounts for soap formation but good results are obtainable with a slight excess of the acid component.

In using the gelling agent according to our invention, the two quantities of the liquid agents are added to an organic liquid such as a hydrocarbon liquid fuel and stirred at ambient temperatures. Between 0.5 and 10 wt. percent of di-acid aluminum soap, preferably between 3 and 7 wt. percent, which approximately corresponds to between 6 wt. percent and 15 wt. percent of the combined liquid components (alkoxide solution and fatty acid solution) based on the gelled liquid, has been found to produce the desired gel.

Gelation begins immediately when the multi-liquid agent and liquid hydrocarbon mixture are stirred at ambient temperatures of between about 30° F. and 100° F. and the initial gelation is reached in about 0.2 to about 10 minutes, depending somewhat on the degree of agitation. The initial gelation may be determined by a standard test which is in terms of the "Vortex Time," i. e., the time necessary to obtain a specific diminution in the amplitude of a vortex in a mass stirred under defined conditions. For general laboratory testing of gelling agents of quantity of the hydrocarbon solvent is introduced into a square-type pint Mason jar having dimensions approximately 3 inches by 3 inches by 5 inches deep. A total weight of 200 grams of solvent and gelling agent is employed. For example, if 4 wt. percent gell is to be prepared, 8 grams of the gelling agent will be added to 192 grams of the solvent. A glass stirring rod is employed which is about 3/8 inch in diameter with 4 vanes, 7/8 by 7/8 by 1/8 inch, set at right angles and with faces parallel to the axis of the rod. The stirrer is mounted within the jar with the bottom of the stirrer 1/2 inch above the bottom of the jar. A reference mark is made on the glass rod 1.0 cm. below the surface of the test solvent. The stirring speed is adjusted to 300±10 R. P. M. and the temperature of the solution is controlled at some standardized temperature. For example, 77° F. was used in our work. The time elapsed between the addition of the gelling agent sample and the covering of the reference mark on the rod by the rising vortex is recorded as the "Vortex Time." A "Vortex Time" of about 10 to 20 minutes, or less, indicates for most purposes a satisfactory gelation rate.

The properties of the final gel may be measured by the

"Gardner Load" which is a measure of viscosity and indicates the consistency of a given gel. It is determined by a Gardner mobilometer, an apparatus described in "Physical and Chemical Examination of Paints, Varnishes, Lacquers and Colors" 10th edition (May 1946) by Henry A. Gardner and G. G. Sward, which is distributed by Henry A. Gardner Laboratory, Inc., Bethesda, Maryland.

The test is ordinarily made at 24 or 48 hours after the initial gelling has taken place and the values are in terms of grams per 100 seconds. A gel containing 4 wt. per cent of di-acid aluminum soap, corresponding to about 8% of the combined liquid components described herein, will usually exhibit a Gardner Load between about 150 and 350 grams. Such a gel will have desirable splattering, cohesion and burning properties.

In one example of our invention the first liquid component comprised 40 wt. per cent aluminum isopropoxide, practical grade, dissolved in toluene. The second liquid component comprised 57.7 wt. per cent isooctanoic acid and 3.1 wt. per cent water in methyl ethyl ketone. To 179 grams of stirred Standard Test Solvent, conforming to the specifications contained in JAN-N-589, Amendment 2, was added at room temperature 20.8 grams of the acid solution. The test solvent became turbid but cleared rapidly upon the addition of 27.5 grams of the alkoxide solution. While stirring at 300 R. P. M., the initial gelation was complete about 13 seconds after the addition of the alkoxide solution. The gel developed a stringy consistency, with marked adhesive properties, very rapidly and after standing at room temperature for 24 hours possessed a Gardner Load of 860 grams per 100 seconds.

We also contemplate that the invention can be applied to gelling slurries of finely divided solids in hydrocarbon liquids. For example, we may gel slurries of finely divided metals such as aluminum or magnesium or naturally occuring minerals such as sand or salts. Likewise, before the final gelling has occurred, we may admix such finely divided metals or solids to the partially gelled hydrocarbon. A particularly useful system is in the gelling of a slurry of about 15 wt. per cent of finely divided aluminum or magnesium in kerosene. Our liquid gelling agents are admirably adapted for such purposes.

Although we have described our invention in terms of specific examples, which are set forth in considerable detail, it should be understood that these are by way of illustration only and that the invention is not limited thereto. Alternative embodiments and operating techniques will become apparent to those skilled in the art in view of our disclosure. Accordingly, modifications of our invention are contemplated without departing from the spirit of the described invention or the scope of the appended claims.

We claim:

1. The method of preparing a gelled hydrocarbon fuel which method comprises introducing into said hydrocarbon fuel two liquid streams, the first stream being a liquid reactant consisting esssentially of an anhydrous aromatic hydrocarbon solution of about 30 wt. per cent to about 75 wt. per cent of an aluminum alkoxide, the second stream being a liquid reactant consisting essentially of fatty acid having 8 carbon atoms per molecule dissolved in a low boiling ketone containing dissolved water, the amount of said fatty acid and water being sufficient to convert said aluminum alkoxide to a soap having an aluminum content corresponding to that of aluminum di-acyl hydroxide and the amount and proportions of the streams being sufficient to give an aluminum soap concentration in the gelled hydrocarbon fuel in the range of about .5 to 10 wt. per cent and agitating the commingled streams an hydrocarbon fuel to produce the gelled hydrocarbon fuel.

2. The method of preparing a gelled hydrocarbon fuel which method comprises the steps of (1) introducing into a quantity of said hydrocarbon fuel two liquid streams consisting of a first stream of liquid reactant consisting essentially of a solution of about 55 to about 65 wt. per cent of at least one $C_8$ fatty acid dissolved in about 30 to about 40 wt. per cent of a ketone having from 3 to 8 carbon atoms per molecule said ketone having dissolved therein about 2 to about 4 wt. per cent of water, and a second stream of liquid reactant consisting essentially of an anhydrous aromatic hydrocarbon solution of about 30 wt. per cent to about 75 wt. per cent of an aluminum alkoxide, (2) adjusting the relative proportions of said first and second streams added to said hydrocarbon fuel to produce in said hydrocarbon fuel from about 0.5 to about 10 wt. per cent of aluminum di-acyl hydroxide, and (3) agitating the commingled streams and hydrocarbon fuel to produce the gelled hydrocarbon fuel.

3. The method as described in claim 2 wherein the ketone is selected from the class consisting of methyl ethyl ketone and acetone.

4. The method as described in claim 2 wherein the hydrocarbon fuel is gasoline.

5. The method of preparing a gelled hydrocarbon fuel which method comprises introducing into said hydrocarbon fuel two liquid streams consisting of a first stream of liquid reactant comprised essentially of a solution of about 55 to about 65 wt. per cent of mixed isooctanoic acids in about 30 to about 40 wt. per cent of a ketone having from 3 to 8 carbon atoms per molecule, said solution having dissolved therein from about 2 to about 4 wt. per cent of water, and introducing to said hydrocarbon fuel a second stream of liquid reactant consisting essentially of an anhydrous aromatic hydrocarbon solution of about 30 wt. per cent to about 75 wt. per cent of an aluminum alkoxide, adjusting the relative proportions of said streams added to said hydrocarbon fuel to produce therein from about 0.5 to about 10 wt. per cent of an aluminum soap having an aluminum content corresponding approximately to the aluminum content of aluminum di-acyl hydroxide and agitating the commingled streams and hydrocarbon fuel to produce the gelled hydrocarbon fuel.

6. The method as described in claim 5 wherein the ketone is selected from the class consisting of methyl ethyl ketone and acetone.

7. The method of preparing a gelled hydrocarbon fuel which method comprises introducing into said hydrocarbon fuel two liquid streams, the first stream being a liquid reactant consisting of an anhydrous aromatic hydrocarbon solution of about 30 wt. per cent to about 75 wt. per cent of an aluminum alkoxide, the second stream being a liquid reactant consisting of at least one fatty acid containing from 7 to 13 carbon atoms per molecule dissolved in a low boiling ketone containing dissolved water, the amount of said fatty acid and water being sufficient to convert said aluminum alkoxide to a soap having an aluminum content corresponding to that of aluminum di-acyl hydroxide and the amount and proportions of the streams being sufficient to give an aluminum soap concentration in the gelled hydrocarbon fuel in the range of about 0.5 to 10 wt. per cent and agitating the commingled steams and hydrocarbon fuel to produce said gelled hydrocarbon fuel.

References Cited in the file of this patent

UNITED STATES PATENTS

| | | |
|---|---|---|
| 2,492,173 | Mysels | Dec. 27, 1949 |
| 2,606,107 | Fieser | Aug. 5, 1952 |
| 2,618,536 | Hunn | Nov. 18, 1952 |
| 2,618,596 | Minich | Nov. 18, 1952 |
| 2,648,694 | Mason | Aug. 11, 1953 |

OTHER REFERENCES

Bailey: "Melting and Solidification of Fats," Interscience Publishers, Inc., New York (1950).